Patented Jan. 30, 1951

2,539,920

UNITED STATES PATENT OFFICE 2,539,920

CROSS-LINKED POLYMERIC MATERIALS AND METHOD OF MAKING SAME

Paul W. Morgan, Kenmore, N. Y., assignor to E. I. du Pont de Nemours & Company, Wilmington, Del., a corporation of Delaware No Drawing. Application September 16, 1947, Serial No. 774,442

22 Claims. (Cl. 260—15)

This invention relates to polymeric materials and method of making the same. More particularly, it relates to cross-linked polymeric materials and the method of making the same.

The term "polymeric material," as used throughout this specification and the appended claims, is intended to designate a macromolecular organic compound containing a recurring unit or units, which units may be cyclic or acyclic in nature, and which are linked together within the compound in chain-like fashion. The compound may be a naturally occurring one or may be partly or wholly synthetic. Cellulose is an example of a naturally occurring polymeric material, while examples of partly or wholly synthetic polymeric materials include such substances as cellulose esters or ethers, the so-called addition polymers including such substances as polyvinyl alcohol and its derivatives, polyacrylic acids and their derivatives, and the so-called condensation polymers, including such substances as the polyesters and polyamides of polycarboxylic acids, synthetic resins and the like. Generally, polymeric materials of the type intended for use with this invention possess an average molecular weight in excess of 1000, and exist in the free state as solids at room temperature and atmospheric pressure.

U. S. Patent 2,418,941 discloses that, by reacting thiourea with one or more active groups of a polymeric material to produce an isothiourea derivative, thereafter saponifying such derivative to a mercaptan, and finally oxidizing the mercaptan to a disulfide, a cross-link can be obtained.

An object of this invention is to provide new and improved cross-linked polymeric materials.

Another object of this invention is to provide cross-linked polymeric materials having improved properties.

An additional object of this invention is to provide a new and improved method of cross-linking polymeric materials.

A further object of this invention is to provide a method of directly cross-linking polymeric materials by a polythiourea compound whereby no further steps are required to develop the cross-linking.

Other and additional objects of the invention will become apparent hereinafter.

The objects of this invention are accomplished, in general, by reacting a poly-functional thiourea derivative with a polymeric material containing an active group. Since the poly-functional thiourea derivative contains at least two functional groups, the cross-link is formed directly and no further treatment is required to develop it.

The cross-linked product can be obtained from a solution containing a solvent in which the polymeric material and the poly-functional thiourea derivative are compatible or by impregnating a shaped article formed of the polymeric material with the cross-linking agent.

The details and manner of practicing the invention will become apparent by reference to the following specific examples, it being understood that these examples are merely illustrative embodiments of the invention and that the scope of the invention is not limited thereto. Throughout the examples the proportions are by weight.

Example 1

2 parts of hydroxyethylcellulose acetate chloroacetate (0.14 hydroxyethyl, 2.65 acetyl, and 0.32 chloroacetyl groups per glucose unit) were dissolved in 8 parts acetone and 0.123 part hexamethylene-1-6-dithiourea was added and thoroughly mixed in. The de-aerated solution was cast into film and film strips heated at 110° C. for 10 minutes.

The resulting film was clear, tough, pliable, and insoluble in acetone and other solvents for the unmodified polymeric material. The temperature at which the film stuck to a heated metal bar was increased 23° above that of control samples formed of the unmodified polymeric material, and the cross-linked film did not fuse or break under light loads up to 300° C. though it became discolored at 250° C. A control sample formed of the unmodified polymeric material broke at 225° C. Doubling the amount of the dithiourea reduced the amount of swelling in acetone.

Example 2

1.5 parts of hydroxyethylcellulose acetate chloroacetate (0.33 hydroxyethyl, 2.33 acetyl, and 0.47 chloroacetyl groups per glucose unit) were dissolved in 8.5 parts acetone, and 0.10 part of dithiobiuret was admixed and dissolved. Films cast from this solution were heated at 100° C. The films, after being heated for less than 5 minutes, such as 2 minutes, became insoluble and did not disintegrate in organic solvents for the unmodified polymeric material. The films after being heated for 10 minutes were swollen 50% of their original length upon immersion in acetone, and the films after 30 minutes heating were swollen only 10%. Film strips did not break under light load below 300° C.

Example 3

10 parts of a solution consisting of 1.5 parts of hydroxyethylcellulose acetate chloroacetate in 8.5 parts of acetone were admixed with 0.30 part of a solution of allylthiourea-formaldehyde resin consisting of 0.10 part resin, 0.10 part toluene, and 0.10 part ethanol. Films cast from this mixture were baked at 100° C. After baking for 5 minutes, the film was swollen only 33% in acetone, and after baking for 10 minutes the swelling was down to 8%. A film formed of the resin alone was still easily soluble after baking 30 minutes at 100° C.

Strips of film did not fuse below 300° C., although they were colored brown at 275° C.

Example 4

A soluble thiourea-formaldehyde resin was prepared by reacting 30 grams thiourea and 65 grams of 40% formalin at reflux temperature for 1.5 hours. The resin was coagulated in 500 cc. of an aqueous solution containing 2% sodium chloride, and air-dried.

2 parts of cellulose acetate chloroacetate (2.44 acetyl and 0.31 chloroacetyl groups per glucose unit, and 0.1 part of the dry thiourea-formaldehyde resin were dissolved in methyl Cellosolve-acetone (1:1) mixture to make a solution of about 15% solids by weight.

Clear films were cast from this solution and heated 10 minutes at 100° C. The film was then swollen only 50% of its original dimensions by 95% aqueous acetone. The film did not fuse below 330° C. and was colored only a light brown at 275° C.

The above detailed examples illustrate certain embodiments of the invention wherein specific dithiourea compounds are reacted with specific polymeric materials containing specific reactive groups, i. e. the halogen in the chloroacetate groups. The present invention is not, however, to be restricted to such specific polymeric materials and dithiourea compounds.

The polymeric material can be any polymeric material, such as vinyl polymers, polyacrylic compounds, polymeric resins, cellulose derivatives, linear condensation polymers, for example synthetic resins, synthetic linear condensation polyamides, polyesters, polyethers and polyanhydrides and the like, provided only that the polymeric material contains a reactive or functional group. Illustrative examples of reactive groups which may be contained in the polymeric material are thiocyano groups, halogen esters, sulfate esters and sulfonate esters, for example, mono-, di- or trichloroacetates, chlorketals, chloroacetals, sulfates, alkyl or aryl sulfates, and alkyl, aralkyl or aryl sulfonates.

Several additional illustrative examples of polymers with reactive groups which can be used are:

Ethylcellulose chloroacetate
Ethylcellulose toluenesulfonate
Cellulose acetate thiocyanoacetate
Cellulose acetate toluenesulfonate
Chlorinated rubbers
Thiocyanated rubbers
Chlorinated polyethylene
Polymers of beta-chloro-ethyl acrylate
Copolymers of beta-chloro-ethyl acrylate
Polymers of beta-chloro-ethyl methacrylate
Copolymers of beta-chloro-ethyl methacrylate
Polymers of vinyl beta-chloro-ethyl ether
Copolymers of vinyl beta-chloro-ethyl ether
Polyvinyl chloroacetate
Polyvinyl chloroacetal
Cellulose sulfate
Cellulose acetate sulfate
Polyvinyl sulfate The degree of substitution by active groups should be sufficient to produce the desired effect on softening point, solubility, etc., and it varies with the different polymers. Thus, a very few halogen groups are effective in cellulose acetate chloroacetate (0.05 chloroacetyl group per anhydroglucose unit) while in the case of a less reactive group, such as the chlorine in chlorinated rubber, a much larger number of potentially active groups are required to bring about an equivalent change in properties in the same length of time. There is no upper limit to substitution by reactive groups provided an excess of unused groups does not contribute to instability in the final product.

The cross-linking agent may be any polyfunctional, and preferably a dithiourea derivative, containing the following group:

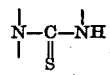

It is to be noted that the above group contains at least 1 hydrogen bound to nitrogen. This permits isomerization to the thio-enol form.

Illustrative examples of polythiourea derivatives which may be used are dithioureas, such as methylenedithiourea, para-xylylenedithiourea, polymethylenedithiourea containing any number of methylene groups, dithioureas of the following types:

(a) 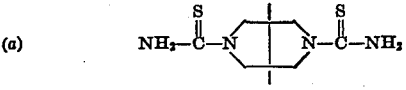

(b) 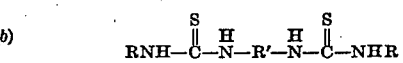

wherein R and R' may be any organic radical, dithiobiurets, thiourea resins, such as soluble resins from formaldehyde or other aldehydes and any mono-substituted alkyl, aryl or aralkyl-thiourea.

The temperature at which the polymer is cross-linked by the cross-linking agent is preferably between 50° C. and the decomposition point of the polymeric product. In general, the time of reaction depends on the temperature. At higher temperatures, a shorter time for the reaction is required than at lower temperatures.

As shown in the examples, the process of this invention makes possible the preparation of new cross-linked polymeric materials. The shaped article is generally prepared from a solution containing a common solvent for and in which the polymeric material and the cross-linking agent are compatible. However, this is not essential and the process can be conducted on a preformed polymeric article. For example, a formed structure, such as a sheet of the selected polymeric material containing reactive groups, can be impregnated in sheet form with the cross-linking agent and then baked, whereby the cross-linking can be effected. In another embodiment of the invention, the modification of the polymer to insert a reactive group and the subsequent cross-linking can be conducted on a preformed article. For example, a formed structure, such as a sheet of cellulose acetate, can be surface-esterified with chloroacetic acid or anhydride to produce a cellulose acetate chloroacetate surface and the resulting film, after impregnation in sheet form with the cross-linking agent, baked. When the cross-linking agent is incorporated in a formed article by an after treatment, the formed article is immersed in a solution of the cross-linking agent, the solvent of which is a non-solvent for the polymeric material. During such impregnation the impregnating solution can be heated.

Though the invention has been described specifically in connection with films, it is to be understood that the invention is not restricted thereto. The invention is equally applicable for use in the production of or the after-treatment of any shaped structure, such as yarns, filaments, molded materials, etc., as well as coating compositions. The invention can also be applied to the cross-linking of a plurality, such as two or more, different polymeric materials, each of which contains an active group as hereinbefore described.

Hydroxyethylcellulose acetate chloroacetate disclosed in Examples 1-3 is a new compound and forms the subject-matter of application Serial No. 774,443, filed September 16, 1947, now Patent Number 2,512,960.

The invention provides a simple and easily controlled process for directly cross-linking polymeric materials. The cross-linked polymeric materials of this invention are insoluble in water and the common organic solvents and have improved thermal properties. The invention thus provides a simple, direct method for the transformation of a polymeric material into a polymeric material that is insoluble in water and other organic solvents. The process does not give rise to the formation of undesirable by-products, the cross-linked polymeric material finally obtained being substantially free of undesirable substances and clear, as well as possessing a light color.

Since it is obvious that many changes and modifications can be made in the above-described details without departing from the nature and spirit of the invention, it is to be understood that the invention is not to be limited thereto except as set forth in the appended claims.

I claim:

1. A method of insolubilizing polymeric materials containing at least one reactive group selected from the class which consists of thiocyano esters, halogen esters, sulfate esters and sulfonate esters, which comprises directly cross-linking at a temperature of at least 50° C. such polymeric material with about 5%, based on the weight of said polymeric materials, of a polythiourea compound containing the following group:

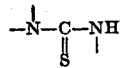

2. The method as set forth in claim 1 wherein the polymeric material containing the reactive group is hydroxyethylcellulose acetate chloroacetate.

3. The method as set forth in claim 1 wherein the polymeric material containing the reactive group is cellulose acetate chloroacetate.

4. The method as set forth in claim 1 wherein the dithiourea compound is a polymethylenedithiourea.

5. The method as set forth in claim 1 wherein the dithiourea compound is hexamethylene-1-6-dithiourea.

6. The method as set forth in claim 1 wherein the dithiourea compound is a thiourea-formaldehyde resin.

7. The method as set forth in claim 1 wherein the dithiourea compound is a allylthiourea-formaldehyde resin.

8. The method which comprises cross-linking hydroxyethylcellulose acetate chloroacetate with about 5%, based on the weight of said chloroacetate, of hexamethylene-1-6-dithiourea.

9. The method which comprises cross-linking hydroxyethylcellulose acetate chloroacetate with about 5%, based on the weight of said chloroacetate, of a allylthioureaformaldehyde resin.

10. The method which comprises cross-linking cellulose acetate chloroacetate with about 5%, based on the weight of said chloroacetate, of a soluble thiourea-formaldehyde resin.

11. The insolubilized polymeric material resulting from cross-linking at a temperature of at least 50° C. a polymeric material containing at least one reactive group selected from the class which consists of thiocyano esters, halogen esters, sulfate esters and sulfonate esters with about 5%, based on the weight of said polymeric materials, of a polythiourea compound containing the following group:

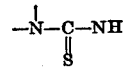

12. The insolubilized, cross-linked polymeric material as set forth in claim 1 wherein the polymeric material containing the reactive group is hydroxyethylcellulose acetate chloroacetate.

13. The insolubilized, cross-linked polymeric material as set forth in claim 1 wherein the polymeric material containing the reactive group is cellulose acetate chloroacetate.

14. The insolubilized, cross-linked polymeric material as set forth in claim 1 wherein the dithiourea compound is polymethylenedithiourea.

15. The insolubilized, cross-linked polymeric material as set forth in claim 1 wherein the dithiourea compound is hexamethylene-1-6-dithiourea.

16. The insolubilized, cross-linked polymeric material as set forth in claim 1 wherein the dithiourea compound is a thiourea-formaldehyde resin.

17. The insolubilized, cross-linked polymeric material as set forth in claim 1 wherein the dithiourea compound is a allylthiourea-formaldehyde resin.

18. The insolubilized, cross-linked product of hydroxyethylcellulose acetate chloroacetate and hexamethylene-1-6-dithiourea.

19. The insolubilized, cross-linked product of hydroxyethylcellulose acetate chloroacetate and allylthiourea-formaldehyde resin.

20. The insolubilized, cross-linked product of cellulose acetate chloroacetate and a soluble thiourea-formaldehyde resin.

21. A method of insolubilizing polymeric materials containing at least one reactive group selected from the class which consists of thiocyano esters, halogen esters, sulfate esters and sulfonate esters, which comprises directly cross-linking at a temperature of at least 50° C. such polymeric material with about 5%, based on said material, of a polythiourea compound selected from the group consisting of polymethylenedithiourea, hexamethylene-1-6-dithiourea, thiourea-formaldehyde resin, and allylthiourea-formaldehyde resin.

22. The insolubilized polymeric material resulting from cross-linking at a temperature of at last 50° C. a polymeric material containing at least one reactive group selected from the class which consists of thiocyano esters, halogen esters, sulfate esters and sulfonate esters with about 5%, based on said material, of a polythiourea compound selected from the group consisting of polymethylene-dithiourea, hexamethylene-1-6-dithiourea, thiourea-formaldehyde resin, and allylthiourea-formaldehyde resin.

PAUL W. MORGAN.

REFERENCES CITED

The following references are of record in the file of this patent:

UNITED STATES PATENTS

| Number | Name | Date |
|---|---|---|
| 2,436,080 | Smith | Feb. 17, 1948 |